(12) United States Patent
Laksono

(10) Patent No.: US 8,949,920 B2
(45) Date of Patent: Feb. 3, 2015

(54) SYSTEM AND METHOD FOR STORAGE DEVICE EMULATION IN A MULTIMEDIA PROCESSING SYSTEM

(75) Inventor: Indra Laksono, Richmond Hill (CA)

(73) Assignee: VIXS Systems Inc., Toronto (CA)

( * ) Notice: Subject to any disclaimer, the term of this patent is extended or adjusted under 35 U.S.C. 154(b) by 2465 days.

(21) Appl. No.: 11/082,591

(22) Filed: Mar. 17, 2005

(65) Prior Publication Data

US 2006/0212922 A1  Sep. 21, 2006

(51) Int. Cl.
| | | |
|---|---|---|
| H04N 7/173 | (2011.01) | |
| H04N 5/765 | (2006.01) | |
| H04N 21/41 | (2011.01) | |
| H04N 5/85 | (2006.01) | |
| H04N 5/91 | (2006.01) | |
| H04N 9/804 | (2006.01) | |

(52) U.S. Cl.
CPC .......... *H04N 5/765* (2013.01); *H04N 21/4135* (2013.01); *H04N 5/85* (2013.01); *H04N 5/91* (2013.01); *H04N 9/8042* (2013.01)
USPC .......... 725/131; 725/132; 725/133; 725/140; 725/141; 725/80; 725/81

(58) Field of Classification Search
USPC ...................................................... 725/131
See application file for complete search history.

(56) References Cited

U.S. PATENT DOCUMENTS

| | | |
|---|---|---|
| 4,866,395 A | 9/1989 | Hosteller |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |

(Continued)

FOREIGN PATENT DOCUMENTS

| | | |
|---|---|---|
| EP | 0661826 A2 | 7/1995 |
| EP | 0739138 A2 | 10/1996 |

(Continued)

OTHER PUBLICATIONS

The American Heritage College Dictionary, $4^{th}$ edition, p. 723.*

(Continued)

*Primary Examiner* — Jun Fei Zhong

(57) ABSTRACT

A device and method for storage device emulation in a multimedia processing system are provided. The device includes a processing module to process multimedia data, a first mass storage device interface operably coupled to the processing module, the first mast storage interface operable to couple to a mass storage device interface of a multimedia processing device and a second mass storage device interface operably coupled to the first mass storage device and the processing module, wherein the second mass storage device is operable to couple to one or more mass storage devices. A method is also provided. The method comprises receiving a first multimedia data at first mass storage device interface of a first multimedia processing device, processing the first multimedia data at the first multimedia processing device to generate a first processed multimedia data and providing the first processed multimedia data to a second mass storage device interface of the first multimedia processing device for output.

30 Claims, 3 Drawing Sheets

(56) References Cited

U.S. PATENT DOCUMENTS

| | | | |
|---|---|---|---|
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,040,863 A | 3/2000 | Kato | |
| 6,081,295 A | 6/2000 | Adolph et al. | |
| 6,141,693 A | 10/2000 | Perlman et al. | |
| 6,144,402 A | 11/2000 | Norsworthy et al. | |
| 6,167,084 A | 12/2000 | Wang et al. | |
| 6,182,203 B1 | 1/2001 | Simar, Jr. et al. | |
| 6,215,821 B1 | 4/2001 | Chen | |
| 6,219,358 B1 | 4/2001 | Pinder et al. | |
| 6,222,886 B1 | 4/2001 | Yogeshwar | |
| 6,236,683 B1 | 5/2001 | Mougeat et al. | |
| 6,259,741 B1 | 7/2001 | Chen et al. | |
| 6,263,022 B1 | 7/2001 | Chen et al. | |
| 6,300,973 B1 | 10/2001 | Feder et al. | |
| 6,307,939 B1 | 10/2001 | Vigarie | |
| 6,314,138 B1 | 11/2001 | Lemaguet | |
| 6,323,904 B1 | 11/2001 | Knee | |
| 6,324,497 B1* | 11/2001 | Yates et al. | 703/24 |
| 6,366,614 B1 | 4/2002 | Pian et al. | |
| 6,385,248 B1 | 5/2002 | Pearlstein et al. | |
| 6,438,168 B2 | 8/2002 | Arye | |
| 6,480,541 B1 | 11/2002 | Girod et al. | |
| 6,526,099 B1 | 2/2003 | Christopoulos et al. | |
| 6,549,561 B2 | 4/2003 | Crawford | |
| 6,584,509 B2 | 6/2003 | Putzolu | |
| 6,714,202 B2 | 3/2004 | Dorrell | |
| 6,724,726 B1 | 4/2004 | Coudreuse | |
| 6,748,020 B1 | 6/2004 | Eifrig et al. | |
| 2001/0026591 A1 | 10/2001 | Keren et al. | |
| 2002/0106022 A1 | 8/2002 | Takahashi et al. | |
| 2002/0110193 A1 | 8/2002 | Yoo et al. | |
| 2002/0138259 A1 | 9/2002 | Kawahara | |
| 2002/0145931 A1 | 10/2002 | Pitts | |
| 2002/0196851 A1 | 12/2002 | Lecoutre | |
| 2003/0086023 A1* | 5/2003 | Chung et al. | 348/714 |
| 2003/0093661 A1 | 5/2003 | Loh et al. | |
| 2003/0152148 A1 | 8/2003 | Laksono | |
| 2004/0049797 A1* | 3/2004 | Salmonsen | 725/132 |
| 2004/0117836 A1* | 6/2004 | Karaoguz et al. | 725/81 |
| 2004/0187152 A1* | 9/2004 | Francis et al. | 725/58 |
| 2004/0258390 A1* | 12/2004 | Olson | 386/46 |
| 2005/0235336 A1* | 10/2005 | Ma | 725/134 |
| 2006/0095947 A1* | 5/2006 | Russ | 725/100 |

FOREIGN PATENT DOCUMENTS

| | | |
|---|---|---|
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding for Multiple Clients," Proceedings of the SPIE, Bellingham, VA, vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Robust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions on Circuits and Systems for Video Technology, vol. 7, No. 3 Jun. 1997, pp. 477-488.

Oh, Hwang-Seok et al., "Block-Matching Algorithm Based on an Adaptive Reduction of the Search Area for Motion Estimation," Real-Time Imaging, Academic Press Ltd., vol. 56, No. 5, Oct. 2000. pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions on Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

(56) References Cited

OTHER PUBLICATIONS

Kroner, Sabine et al., "Edge Preserving Noise Smoothing With an Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, Calfiornia.

Liu, Julia J., "ECE497KJ Course Project: Applications of Wiener Filtering in Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., "Theory and Design of Ferrimagnetic Components," 1990, p. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

SYSTEM AND METHOD FOR STORAGE DEVICE EMULATION IN A MULTIMEDIA PROCESSING SYSTEM

FIELD OF THE DISCLOSURE

The present disclosure relates generally to multimedia processing and more particularly to the storage and access of multimedia data.

BACKGROUND

Multimedia decoding components found in, for example, DVD players and set-top boxes typically utilize a decoder to decode encoded multimedia data (e.g., MPEG video and audio data). The multimedia decoding components then provide the decoded multimedia data for formatting for display as video and audio content. To reduce cost and complexity, many of these multimedia decoding components have limited capabilities. Moreover, these components often implement limited types of interfaces that may be used to connect to other components. Frequently, the only device interface provided by such components is a single mass storage device interface through which the components connect to one or more mass storage devices for the storage of and access to multimedia data. The limited interface capabilities of these multimedia decoding components typically inhibits the ability to connect other components in a conventional manner so as to increase the capabilities and functionality of multimedia processing components implementing a decoder. Accordingly, a system and technique for interfacing with such multimedia components would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving multimedia data processing and storage. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-4 illustrate various techniques for emulating a mass storage device so as to provide supplemental functionality to a multimedia device having a mass storage device interface. In at least one embodiment, a processing device having supplemental functionality is connected to another processing device via its mass storage device interface. The supplemental processing device, in turn, is connected to one or more mass storage devices and utilizes a storage device emulator so as to appear as a conventional mass storage device to the other processing device. The additional functionality may allow the combined device to operate as, for example, an enhanced DVD player, a DVD recorder, a personal video recorder (PVR), a set-top box, and the like. The mass storage devices contemplated herein include, but are not limited to, hard disk drives, optical drives (e.g., CD and DVD drives), solid state storage drives (e.g., flash memory drives), floppy magnetic media drives (e.g., 3.5' floppy drives or Iomega® ZIP® drive), and the like. The mass storage device interfaces contemplated herein are compliant with one or more storage device standards or specifications, including, but not limited to, an AT attachment (ATA) specification, a serial ATA (SATA) specification, an ATA packet interface (ATAPI) specification, a universal serial bus (USB) specification (e.g., USB 1.0, USB 2.0), an IEEE 1394 standard (also known as Firewire), and the like.

For ease of illustration, the following exemplary techniques are described in the context of processing multimedia content formatted in compliance with one or more MPEG standards, such as, for example, MPEG-1, MPEG-2 and/or MPEG-4. The following exemplary techniques also are described in the context of interfaces compliant with an ATAPI specification. However, other multimedia data formats (such as, for example, DiVX, Quicktime, H.261, RealVideo, M-JPEG, and the like) may be utilized in view of the teachings provided herein, as may other storage device interface specifications (such as ATA, SATA, USB, IEEE 1394, and the like) without departing from the spirit or the scope of the present disclosure.

Figure 1:
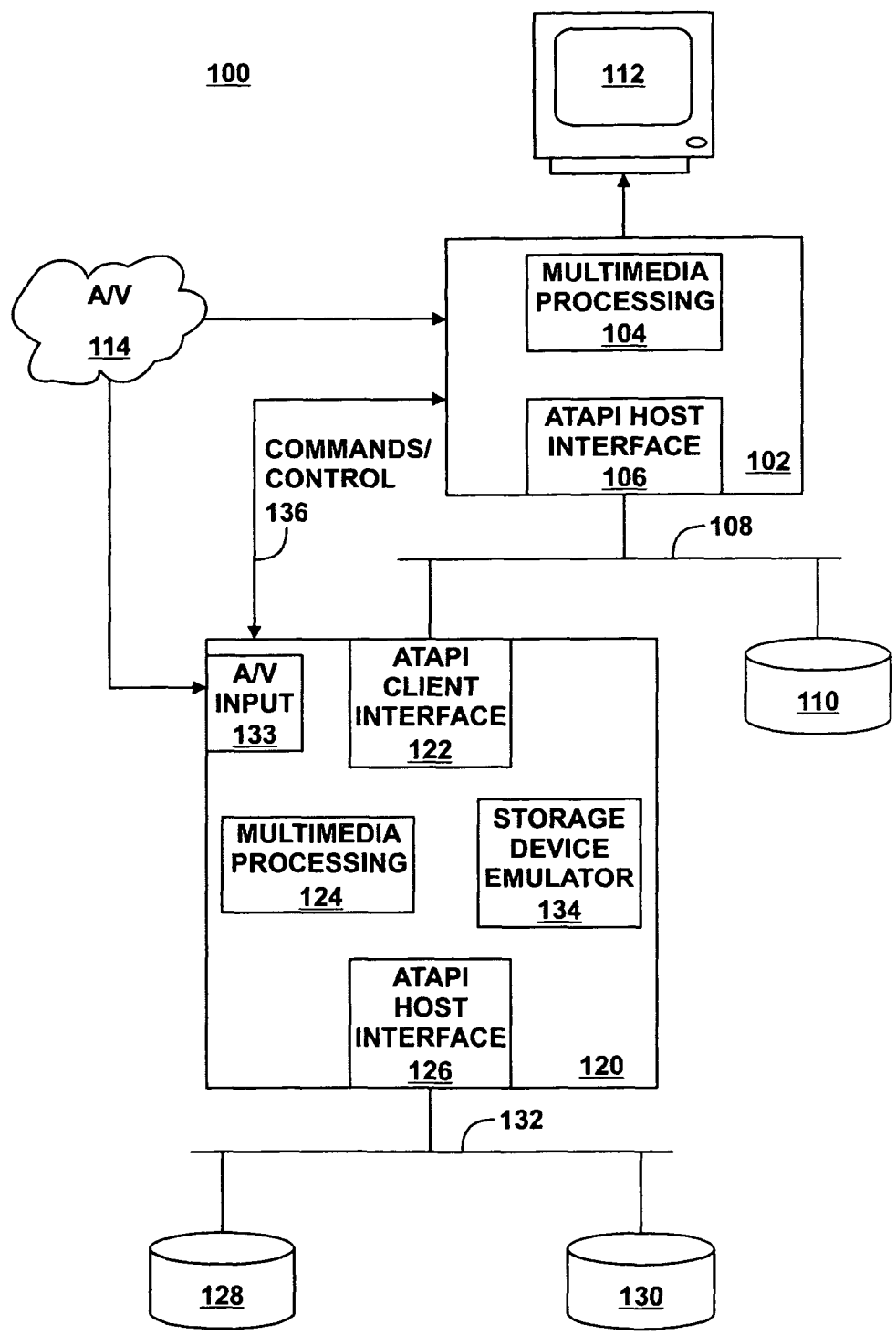
FIG. 1 is a block diagram illustrating an exemplary multimedia processing system utilizing a mass storage emulation device in accordance with at least one embodiment of the present disclosure.

Referring now to FIG. 1, an exemplary multimedia system 100 is illustrated in accordance with at least one embodiment of the present disclosure. The system 100 provides functionality directed to the processing of multimedia data, such as MPEG video and audio data, and may include, for example, a DVD player, a DVD recorder, a cable set-top box, a personal video recorder (PVR) (a commercial example of a PVR includes, for example, the TiVo® box available from TiVo, Inc. of Alviso, Calif.), and the like.

In the illustrated example, the multimedia system 100 includes a multimedia processing device 102 having a processing module 104 and a mass storage device interface, such as ATAPI host interface 106, connected via a storage device bus 100 (e.g., an ATAPI bus) to a mass storage device 110 (e.g., a hard disk drive or a DVD drive). The multimedia processing device 102, in one embodiment, may include an MPEG decoder whereby MPEG data obtained from the storage device 110 via the ATAPI host interface 106 or MPEG data obtained from A/V feed 114 (discussed below) is decoded by the processing module 104. The resulting multimedia content then may be provided for display on display device 112. The multimedia content may be provided, for example, using a display driver (not shown) or the system 100 may include wireless interfaces, such as, for example, IEEE 802.11 compliant wireless transceivers (not shown) to wirelessly transmit a signal representative of the multimedia content.

In at least one embodiment, the multimedia processing device 102 provides only limited multimedia processing capabilities. For example, the multimedia processing device 102 may include an MPEG decoder that, while capable of performing decoding operations, fails to provide, for example, MPEG encoding functionality. Alternately, the multimedia processing device 102 may include, for example, an MPEG encoder capable of performing encoding operations while failing to provide MPEG decoding or transcoding functionality. As additional examples, the multimedia processing device 102 may fail to provide functionality associated with encoding or decoding, such as, for example, dual encoding, DVD authoring, personal video recording (PVR), copy protection and digital rights management tools such as encryption/decryption, and other applications used to contribute to the device's intended application. To illustrate, the multimedia processing device 102 may include a retail DVD player having an MPEG decoder for decoding encoded MPEG data typically obtained from a DVD, but missing any ability to encode or transcode multimedia data.

Accordingly, in at least one embodiment, the system 100 further includes an additional supplemental processing device 120 operably coupled to the multimedia processing device 102, whereby the multimedia processing device 120 supplements the functionality of the multimedia processing device 102. In the illustrated example, the multimedia processing device 120 includes a first mass storage device interface (depicted as ATAPI client interface 122), one or more processing modules 124 and a second mass storage device interface (depicted as ATAPI host interface 126). The ATAPI client interface 122 is coupled to the ATAPI host interface 106 of the multimedia processing device 102 via the ATAPI bus 108. The ATAPI host interface 126 is coupled to one or more mass storage devices 128, 130 via an ATAPI bus 132. The supplemental processing device 120 further may include an A/V input 133 coupled to, for example, the A/V feed 114 to receive encoded or unencoded/decoded multimedia content. The A/V input 133 may include any of a variety of connections utilized to transport multimedia content, such as, for example, a coaxial input to receive cable or terrestrial television signals (including digital cable), a wireless receiver to receive wirelessly-transmitted multimedia content, a network interface (e.g., an Ethernet interface) to receive multimedia content over a network, a set of standard analog audio/video cables (e.g., Y/C, component, or composite cables) coupleable to any of a variety of consumer multimedia products, such as, for example, camcorders, DVD players, and the like.

The one or more processing modules 124, in one embodiment, supplement the functionality provided by the processing module 104 of the multimedia processing device 102. For example, where the processing module 104 is a MPEG decoder, the processing module 124 may include an encoder so as to encode multimedia data provided by or to the processing device 102 or the processing module 124 may include a transcoder so as to transcode multimedia data for provision to the processing device 102 or the storage devices 110, 128 and 130. The one or more processing modules 124 also may provide other capabilities, such as DVD authoring, encryption (e.g., content protection for recordable media (CPRM) scrambling) and other Digital Rights Management (DRM) techniques, subtitle addition, automatic chapter indexing based on cues and keywords retrieved from the stream, keyword detection based on OCR or voice recognition, and the like. Examples of capabilities of the multimedia processing device 120 and its integration with the multimedia processing device 102 are illustrated in detail below with reference to FIGS. 2-4.

In multimedia systems that provide full functionality, multimedia components, such as MPEG encoders, decoders, codecs and transcoders, typically are connected using interfaces tailored specifically for such interconnections. For example, PCI buses frequently are used for generic device connections and ATAPI interfaces are frequently used for connections to storage devices. USB and IEEE1394 connections conventionally are used for storage devices such as flash memory cards or external camcorders. However, in the interest of reducing cost and/or complexity, limited functionality multimedia devices, such as the multimedia processing device 102, may lack such an interface or may not have such an interface available for connection to another multimedia processing device in a conventional manner. To illustrate using the retail DVD player example provided above, the DVD player may have been originally designed so as to only provide DVD playback capabilities and therefore does not have the hardware, firmware or software capabilities to directly manipulate the supplemental processing device 120 through a conventional processing device-to-processing device interface. However, it may be desirable to modify the DVD player so as to implement the supplemental processing device 120 for additional functionality. In this example, the DVD player, by incorporating the supplemental processing device 120, may be converted to a PVR whereby live content or home video can be captured and stored into a local hard disk drive, and in turn, such previously stored multimedia content may be transcoded, and then recorded onto a recordable DVD media. In an example, a cable set top box having a multimedia processing device 102 in the form of a MPEG decoder may be modified to implement a supplemental processing device 102 in the form of an encoder or transcoder so as to convert the decode-only set top box to a PVR with a built in hard disk drive and a DVD recordable drive.

Accordingly, the supplemental processing device 120 may be configured so as to operate as a conventional mass storage device with respect to the multimedia processing device 102. In this instance, the supplemental processing device 120 includes a storage device emulator 134 to manage the operation of the ATAPI client interface 122 and the ATAPI host interface 126 (as well as the one or more processing modules 124) so that the supplemental processing device 120 receives data and commands from, and provides data and commands to, the multimedia processing device 102 in the same or substantially similar manner as would the mass storage device 110. Through storage device emulation provided by storage device emulator 134 and the connection via the mass storage device interfaces of the processing devices 102 and 120, the operations of the supplemental processing device 120 may be entirely transparent to the multimedia processing device 102 because it appears to the multimedia processing device 102 that data is provided to, or obtained from, a conventional mass storage device. For example, the supplemental processing device 120 may be utilized to perform encoding or transcoding operations on data provided from the multimedia processing device 102 prior to storing the encoded/transcoded data in at least one of the storage devices 128 or 130. In this instance, the multimedia processing device 102 provides the data to the supplemental processing device 120 via the ATAPI host interface 106 as it would provide data to the mass storage device 110.

As another example, the supplemental processing device 120 may encode or transcode data obtained from the mass storage devices 128 or 130 prior to providing the encoded/transcoded data to the multimedia processing device 102 via the ATAPI client interface 122. In this instance, the multimedia processing device 102 receives the data as it would from the mass storage device 110 without necessarily being aware of the supplemental encoding/transcoding operations performed by the supplemental processing device 120 prior to receiving the data.

In other embodiments, it may be desirable for the multimedia processing device 102 to be aware of the particular capabilities of the supplemental processing device 120. For example, it may be desirable to convert a retail set-top box from a device that simply decodes MPEG data and then provides the decoded MPEG data for display to a PVR that is capable of re-encoding or transcoding the MPEG data, storing the re-encoded/transcoded MPEG data, and then subsequently decoding the MPEG data for later playback. In these implementations, the software and/or firmware of the multimedia processing device 102 may be updated or upgraded so that the multimedia processing device 102 is able to manipulate the supplemental processing device 120 so that the supplemental processing device 120 provides the desired functionality. In this instance, the interface between the processing devices 102 and 120 provided by the ATAPI interfaces 106, 122 and the ATAPI bus 108 allows the multimedia processing device 102 to be upgraded in the above-described manner without requiring substantial hardware modifications that would be necessary to connect the processing devices 102 and 120 in a conventional manner.

The storage device emulator 134 may include software, firmware, or hardware, or a combination therein, so as to allow the supplemental processing device 120 to receive and provide commands and data via the ATAPI client interface 122 in the same or similar manner that a conventional mass storage device would receive and provide commands and data via its ATAPI client interface. Likewise, the storage device emulator 134 operates the ATAPI host interface 126 to provide and receive commands and data from the mass storage devices 128 and 130. Further, the storage device emulator 134 acts as an ATAPI bridge by reflecting data and commands between the ATAPI client interface 122 and the ATAPI host interface 126 when no additional processing is to be provided by the one or more processing modules 124 for data supplied by the provided by the multimedia processing device 102 for storage in the mass storage devices 128 or 130, or on data obtained from the mass storage devices 128 or 130 for provision to the multimedia processing device 102 (i.e., when the supplemental processing device 120 is operating in a "pass-through" mode).

In many instances, the ATAPI connection provided by the ATAPI host interface 106, ATAPI bus 108 and the ATAPI client interface 122 may be sufficient for the operations of the processing devices 102 and 120. However, in other instances, additional control signaling may be desirable, accordingly, a separate command/control bus 136 may be implemented between the processing devices 102 and 120. The additional signaling may be done via common busses such as I2C or UART or by less complex busses such as an SRAM-like eight-bit or sixteen-bit parallel bus.

The multimedia system 100 may be utilized in any of a variety of ways. For example, the capabilities of the processing devices 102 and 120 may be combined to provide a DVD player with enhanced capabilities. In this implementation, rather than connecting the DVD drive directly to the ATAPI host interface 106 for direct access by the multimedia processing device 102, the DVD drive is coupled to the ATAPI host interface 126 of the supplemental processing device 120. In this manner, multimedia content from the DVD drive may be obtained by the supplemental processing device 120 and then "pre-processed" (e.g., transcoded or deciphered) by performing one or more processing operations on the data representative of the multimedia content. The "pre-processed" multimedia content then may be provided from the processing device 120 to the processing device 102 via the ATAPI interfaces 106, 122 and ATAPI bus 108. As the multimedia processing device 102 receives the multimedia content from the ATAPI host interface 106 as it would receive multimedia content from a conventional DVD drive coupled to the ATAPI bus 108, the "preprocessing" of the multimedia content provided by the supplemental processing device 120 may be transparent to the multimedia processing device 102.

The system 100 alternatively may be configured to operate as a "pseudo" DVD player whereby multimedia content supplied by the A/V feed 114 to the supplemental processing device 120 may be encoded (if the multimedia content is in an unencoded or decoded form) or transcoded (if the multimedia content is in an encoded form) by the processing module 124 and the encoded/transcoded multimedia content may be stored to one or both of the storage devices 128 or 130. The stored media content from the A/V feed 114 subsequently may be obtained from the storage devices 128 or 130 and provided to the multimedia processing device 102 for decoding and display as described above.

Figure 2:
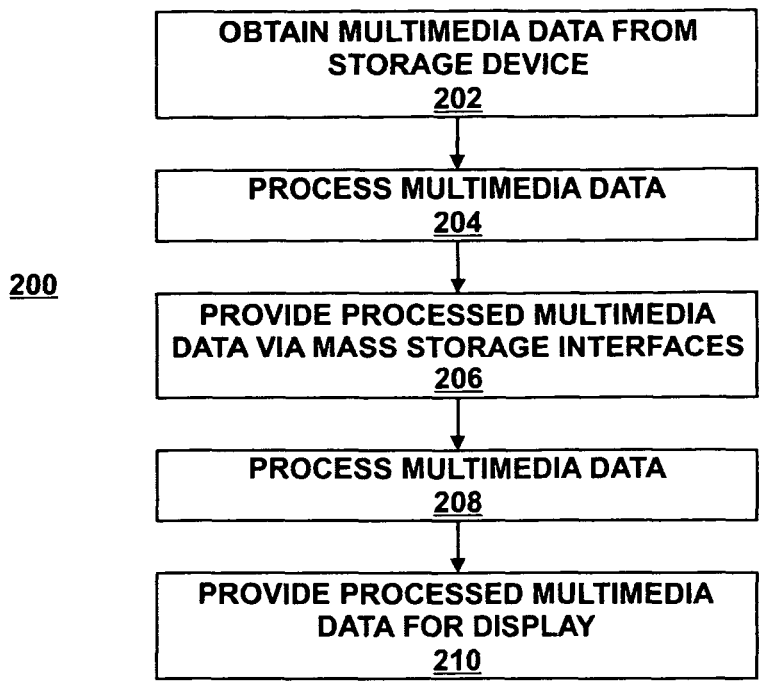
FIGS. 2 and 3 are flow diagrams illustrating exemplary operations of the multimedia processing system of FIG. 1 in accordance with at least one embodiment of the present disclosure.

Referring to FIG. 2, an exemplary method 200 of operation of the system 100 (FIG. 1) as an enhanced DVD player as described above is illustrated. At step 202, the supplemental processing device 120 obtains multimedia data from one of storage devices 128 or 130 (implemented as, for example a DVD drive) via the ATAPI interface 126 and the ATAPI bus 132. Alternately, the multimedia data is obtained directly from the A/V feed 114 via the A/V input 133. In one instance, multimedia data is unencoded. Accordingly, at step 204, the processing module 124 performs one or more processing operations on the multimedia data, such as encoding the multimedia data. In another instance, the multimedia data is encoded, but it may have a resolution, frame rate, bit rate, or other characteristic that is unsupported by, or not optimal for, the decoding capability of the processing module 104 of the processing device 102. Accordingly, in this instance, the multimedia data is transcoded by the processing module 124 at step 204. Additional processing operations, such as descrambling, decryption or deciphering operations, higher level programmable features such as keyword detection based on optical character recognition (OCR) or voice recognition, and automatic chapter indexing based on cues in the stream, may be performed by the processing module 124 at step 204. At step 206, the encoded/transcoded multimedia data is provided to the multimedia processing device 102 via the ATAPI client interface 122, the ATAPI bus 108 and the ATAPI host interface 106. In this instance, the encoded/transcoded multimedia data may be transmitted in accordance with conventional ATAPI protocols, with the assistance of the storage device emulator 134, so that the encoded/transcoded multimedia data appears to the processing device 102 to have been provided by a conventional mass storage device. At step 208 the processing module 104 decoded the encoded/transcoded multimedia data and the decoded multimedia data is provided for display on the display device 112 at step 210.

In other instances, the system 100 may be configured so as to provide a PVR whereby multimedia content received from the A/V feed 114 may be recorded and then provided for subsequent playback. In this case, multimedia content provided via the A/V feed 114 is received by the multimedia processing device 102 via an A/V input similar to the A/V input 133 discussed above. The data representing the multimedia content is decoded by the processing module 104 as necessary and the resulting data is provided to the supplemental processing device 102 via the ATAPI interfaces 106 and 102 and the ATAPI bus 108. The decoded data also may be formatted and output for display by the display device 112 at the same time. The processing module 124 can encode or transcode the receive data and store it to one or both of the mass storage devices 128 or 130. In the event that the mass storage device used to store the data is a DVD drive, the processing module 124 further may provide DVD authoring functionality when writing the data to a DVD. The stored data subsequently may be accessed and provided to the processing module 104 via the ATAPI interfaces 106 and 122 and the ATAPI bus 108, whereupon it is decoded and formatted for display on the display device 112 in accordance to instructions received from a user of the system 100.

Figure 3:
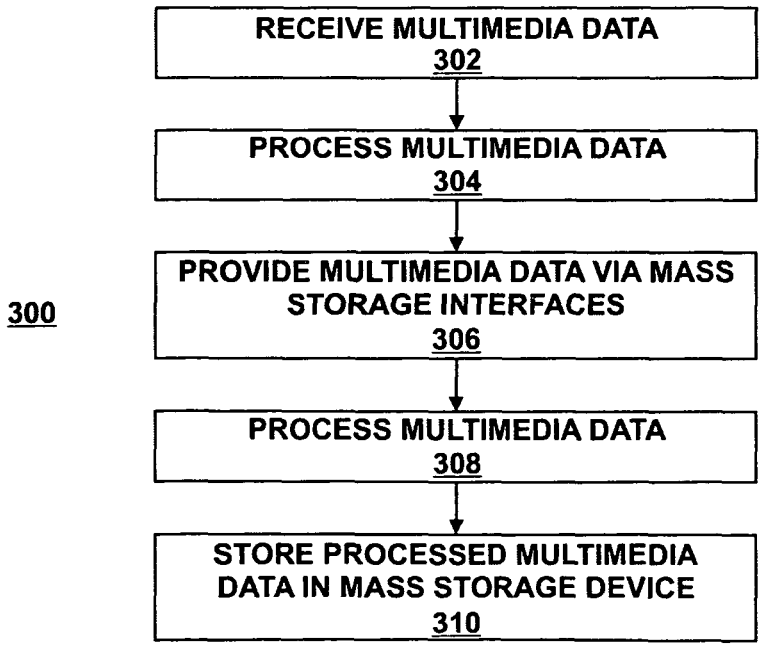

Referring to FIG. 3, an exemplary method 300 of operation of the system 100 (FIG. 1) to store multimedia content as described above is illustrated. At step 302 multimedia data representative of multimedia content is received at the multimedia processing device 102 via, for example, the A/V feed 114 or via the mass storage device 110. At step 304, the processing module 104 processes the received multimedia data. Processing of the multimedia data may include, for example, processing operations directed to decoding the multimedia data when the multimedia data is encoded at the time of its receipt or transcoding the multimedia data. At step 306, the multimedia data is provided to the supplemental processing device 120 via the ATAPI interfaces 106, 122 and the ATAPI bus 108. At step 308, the multimedia data is encoded if received in a decoded/unencoded form or the multimedia data may be transcoded if received in an encoded form. Alternately, encoded multimedia data may remain unprocessed by the processing module 124. At step 310, the encoded/transcoded data is provided to one or more of the storage devices 128 or 130 for storage via the ATAPI host interface 126 and the ATAPI bus 132. Subsequent access to the stored data for playback at the display device 112 may be performed as described with respect to FIG. 2 above.

Figure 4:
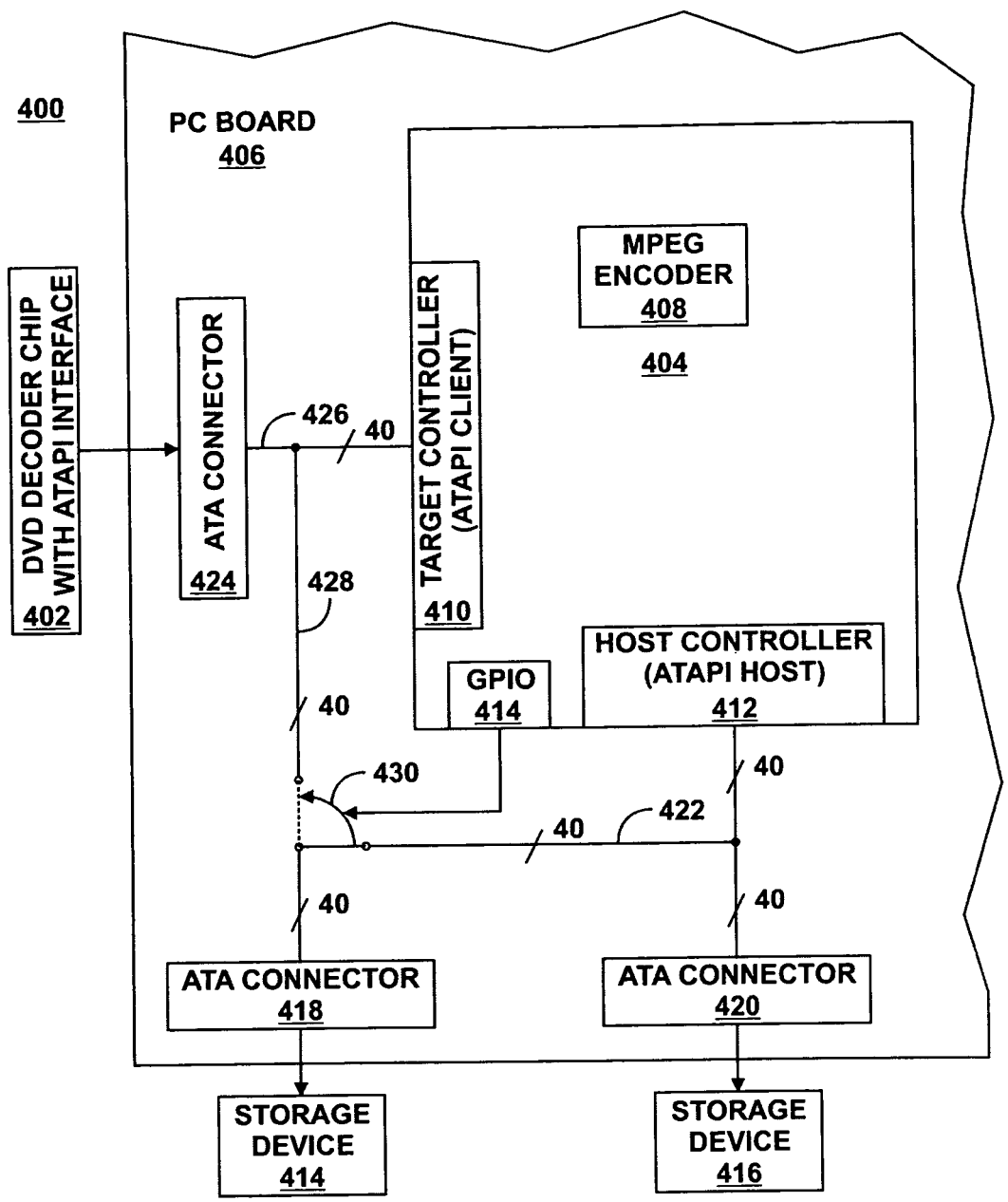
FIG. 4 is a block diagram illustrating an exemplary implementation of a multimedia processing system using mass storage device emulation in accordance with at least one embodiment of the present disclosure.

Referring now to FIG. 4, an exemplary implementation of a multimedia system is illustrated in accordance with at least one embodiment of the present disclosure. The system 400 includes a DVD decoder 402 having an ATAPI host interface (not shown) coupled to a supplemental encoding device 404 implemented as, for example, a system on a chip (SOC) on a printed circuit board (PCB) 406. In the illustrated example, the supplemental encoding device 404 includes an MPEG encoder 408, an ATAPI client interface 410, an ATAPI host interface 412, and a general purpose input/output (GPIO) 414. The ATAPI host interface 412 is operably coupled to storage devices 414 and 416 via ATA connectors 418 and 420, respectively, and ATAPI bus 422 at the PCB 406. The ATAPI client interface 410 is operably coupled to the ATAPI host interface of the DVD decoder 402 via an ATA connector 416 and an ATAPI bus 418 at the PCB 406. The ATAPI bus 426, and therefore the ATA connector 424 and the ATAPI client interface 410, is coupleable to the ATA connector 418, and therefore the storage device 414, via a bus extension 428 and a switch 430 operable based on the output of the GPIO 414. Thus, a connection to the storage device 414 and 416 may be alternated between the supplemental encoding device 404 and the DVD decoder 402 using the switch 430.

In modes utilizing the functionality of the encoding device 404, the switch 430 may be operated such that the ATAPI host interface 412 is connected to both ATA connectors 418 and 420, and therefore connected to both storage device 414 and storage device 416. In such modes, the supplemental processing device 404 may be used to transfer data between the storage devices 414 and 416 (with or without performing encoding operations by the MPEG encoder 408), data may be obtained from one or both of the storage devices 414 and 416, processed, and provided to the DVD decoder 402, or data may be received from the DVD decoder 402, processed, and then provided to one or both of the storage devices 414 or 416. In other modes, the functionality provided by the supplemental encoding device 404 may be bypassed using the switch 430 so that the data is transmitted directly between the ATA connectors 418 and 424 (and therefore directly between the DVD decoder 402 and the storage device 414). In such modes, the DVD decoder 402 may provide data directly to the storage device 414 for storage or the DVD decoder 402 may obtain data directly from the storage device 414 without routing the data through the encoding device 404.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. An integrated circuit (IC) device comprising:
a first host interface configured to couple to a first client interface of a mass storage device via a first bus, the first host interface, the first client interface, and the first bus compliant with at least one of an ATA specification, an SATA specification, an ATAPI specification, a USB specification, or an IEEE 1394 specification;
a second client interface configured to couple to a second host interface of a multimedia processing device via a second bus, the second client interface, the second host interface, and the second bus compliant with at least one of an ATA specification, an SATA specification, an ATAPI specification, a USB specification, or an IEEE 1394 specification; and
a processing module coupled to the first host interface and the second client interface, the processing module to receive a first multimedia data via the second client interface, perform a first processing operation on the first multimedia data to generate a first processed multimedia data, provide the first processed multimedia data to the first host interface for storage at the mass storage device, subsequently access the first processed multimedia data from the mass storage device via the first host interface, perform a second processing operation on the first processed multimedia data to generate a second processed multimedia data, and provide the second processed multimedia data to the multimedia processing device via the second client interface.

2. The IC device of claim 1, further comprising a storage device emulator to manipulate the second client interface so that the IC device appears as a conventional mass storage device to the second host interface of the multimedia processing device.

3. The IC device of claim 1, wherein the first processing operation comprises at least one of an encoding operation, a decoding operation, a transcoding operation, a ciphering operation, a deciphering operation, or a DVD authoring operation.

4. The IC device of claim 1, wherein the first processing operation comprises a decoding operation and the second processing operation comprises an encoding operation.

5. The IC device of claim 1, wherein the first processing operation comprises an encoding operation and the second processing operation comprises a decoding operation.

6. The IC device of claim 1, wherein the first processing operation comprises a ciphering operation and the second processing operation comprises a deciphering operation.

7. The IC device of claim 1, wherein the first processing operation comprises a deciphering operation and the second processing operation comprises a ciphering operation.

8. The IC device of claim 1, further comprising:
an output to control a switch, the switch operable to couple, in a first mode, the second bus and the second client interface in a first mode and to couple, in a second mode, the second bus and the first bus so as to bypass the IC device.

9. A system comprising:
a first bus compliant with at least one of an ATA specification, an SATA specification, an ATAPI specification, a USB specification, or an IEEE 1394 specification;
a second bus compliant with at least one of an ATA specification, an SATA specification, an ATAPI specification, a USB specification, or an IEEE 1394 specification;
a multimedia processing device comprising a first host interface coupled to the first bus;
a mass storage device comprising a first client interface coupled to the second bus; and
an integrated circuit (IC) device comprising:
a second client interface coupled to the first bus;
a second host interface coupled to the second bus;
a processing module coupled to the second client interface and the second host interface, the processing module to receive a first multimedia data via the second client interface, perform a first processing operation on the first multimedia data to generate a first processed multimedia data, provide the first processed multimedia data to the second host interface for storage at the mass storage device, subsequently access the first processed multimedia data from the mass storage device via the second host interface, perform a second processing operation on the first processed multimedia data to generate a second processed multimedia data, and provide the second processed multimedia data to the multimedia processing device via the second client interface; and
a storage device emulator to manipulate the second client interface so that the IC device appears as a conventional mass storage device to the first host interface of the multimedia processing device.

10. The system of claim 9, wherein the first processing operation comprises at least one of an encoding operation, a decoding operation, a transcoding operation, a ciphering operation, a deciphering operation, or a DVD authoring operation.

11. The system of claim 10, wherein the processing module comprises at least one of an encoder, a decoder, a codec, a transcoder, a content protection module, a DVD authoring module, a deciphering module, or a ciphering module.

12. The system of claim 9, wherein the first processing operation comprises a decoding operation and the second processing operation comprises an encoding operation.

13. The system of claim 9, wherein the first processing operation comprises an encoding operation and the second processing operation comprises a decoding operation.

14. The system of claim 9, wherein the system comprises at least one of a cable set-top box, a personal video recorder (PVR), a DVD player, or a DVD recorder.

15. The system of claim 9, wherein the first processing operation comprises a ciphering operation and the second processing operation comprises a deciphering operation.

16. The system of claim 9, wherein the first processing operation comprises a deciphering operation and the second processing operation comprises a ciphering operation.

17. The system of claim 9, further comprising:
a switch operable to couple, in a first mode, the first bus and the second client interface in a first mode and to couple, in a second mode, the second bus and the first bus so as to bypass the IC device.

18. The system of claim 17, further comprising an output to control the switch.

19. A method comprising:
receiving, at a client interface of an integrated circuit (IC) device, a first multimedia data from a multimedia processing device via a first bus, the client interface and the first bus compliant with at least one of an ATA specification, an SATA specification, an ATAPI specification, a USB specification, or an IEEE 1394 specification;
processing the first multimedia data at a processing module of the IC device to generate a first processed multimedia data;
providing the first processed multimedia data to a host interface of the IC device for transmission from the host interface to a mass storage device via a second bus, the host interface and the second bus compliant with at least one of an ATA specification, an SATA specification, an ATAPI specification, a USB specification, or an IEEE 1394 specification;
accessing the first processed multimedia data from the mass storage device via the second bus;
processing the first processed multimedia data at the processing module to generate a second processed multimedia data; and
providing the second processed multimedia data to the client interface of the IC device for transmission to the multimedia processing device.

20. The method of claim 19, wherein:
processing the first multimedia data comprises encoding the first multimedia data; and
processing the first processed multimedia data comprises decoding the first processed multimedia data.

21. The method of claim 19, wherein:
processing the first multimedia data comprises decoding the first multimedia data; and
processing the first processed multimedia data comprises encoding the first processed multimedia data.

22. The method of claim 19, wherein processing the first multimedia data comprises performing at least one of an encoding operation, a decoding operation, a transcoding operation, a ciphering operation, a deciphering operation, or a DVD authoring operation.

23. The method of claim 19, further comprising:
operating the client interface of the IC device so that the IC device appears as a conventional mass storage device to the multimedia processing device.

24. The method of claim 19, wherein the multimedia processing device, the IC device, and the mass storage device together comprise at least one of a cable set-top box, a personal video recorder (PVR), a DVD player, and a DVD recorder.

25. The method of claim 19, wherein a switch alternatively couples the first bus and the second bus or the client interface of the IC device and the first bus, the method further comprising:
configuring the switch to couple the first bus to the second bus; and
bypassing the IC device for a transfer of a second multimedia data between the multimedia processing device and the mass storage device via the first bus and the second bus.

26. The method of claim 25, further comprising:
controlling the switch based on an output of the IC device.

27. A system comprising:
a switch; and
an integrated circuit (IC) device comprising:
- a host interface coupleable to a mass storage device via the switch and a first bus, the host interface and the first bus compliant with at least one of an ATA specification, an SATA specification, an ATAPI specification, a USB specification, or an IEEE 1394 specification;
- a client interface configured to couple to a multimedia processing device via a second bus, the client interface and the second bus compliant with at least one of an ATA specification, an SATA specification, an ATAPI specification, a USB specification, or an IEEE 1394 specification; and
- a processing module coupled to the host interface and the client interface, the processing module to perform at least one processing operation on multimedia data transferred between the host interface and the client interface; and
- wherein the switch is operable to, in a first mode, couple the host interface and the first bus and, in a second mode, couple the first bus and the second bus so as to bypass the IC device.

28. The system of claim 27, wherein the IC device further comprises an output to control the switch.

29. The system of claim 27 further comprising a storage device emulator to manipulate the client interface so that the IC device appears as a conventional mass storage device to the multimedia processing device.

30. The system of claim 27, wherein the at least one processing operation comprises at least one of an encoding operation, a decoding operation, a transcoding operation, a ciphering operation, a deciphering operation, or a DVD authoring operation.

* * * * *